(12) United States Patent
Buettner

(10) Patent No.: US 10,848,730 B2
(45) Date of Patent: Nov. 24, 2020

(54) RAW IMAGE PROCESSING SYSTEM AND METHOD

(71) Applicant: Blackmagic Design Pty Ltd, Port Melbourne (AU)

(72) Inventor: Carsten Buettner, Port Melbourne (AU)

(73) Assignee: Blackmagic Design Pty Ltd, Port Melbourne (AU)

( * ) Notice: Subject to any disclaimer, the term of this patent is extended or adjusted under 35 U.S.C. 154(b) by 0 days.

(21) Appl. No.: 16/007,654

(22) Filed: Jun. 13, 2018

(65) Prior Publication Data

US 2018/0367775 A1    Dec. 20, 2018

(30) Foreign Application Priority Data

Jun. 15, 2017    (AU) ................................ 2017902284

(51) Int. Cl.
| | |
|---|---|
| *H04N 9/73* | (2006.01) |
| *H04N 9/78* | (2006.01) |
| *H04N 9/64* | (2006.01) |
| *H04N 9/04* | (2006.01) |
| *G06T 3/40* | (2006.01) |
| *H04N 5/232* | (2006.01) |

(52) U.S. Cl.
CPC ............ *H04N 9/78* (2013.01); *G06T 3/4015* (2013.01); *G06T 3/4038* (2013.01); *H04N 5/23232* (2013.01); *H04N 9/045* (2013.01); *H04N 9/04515* (2018.08); *H04N 9/646* (2013.01); *H04N 2209/046* (2013.01)

(58) Field of Classification Search
CPC ............ H04N 9/77; H04N 9/78; H04N 9/646; H04N 9/045; H04N 5/23232; G06T 5/001; G06T 5/002; G06T 3/4015; G06T 3/4038; G06T 3/4069; G06T 11/001
See application file for complete search history.

(56) References Cited

U.S. PATENT DOCUMENTS

| | | |
|---|---|---|
| 7,002,627 B1 | 2/2006 | Raffy et al. |
| 8,743,208 B2 | 6/2014 | Ovsiannikov |
| 2004/0061902 A1 | 4/2004 | Tang et al. |
| 2004/0227824 A1 | 11/2004 | Takahashi |
| 2007/0110300 A1 | 5/2007 | Chang et al. |
| 2007/0153335 A1* | 7/2007 | Hosaka .................... H04N 1/58 358/463 |

(Continued)

OTHER PUBLICATIONS

Extended European Search Report for Application No. 18178109.7, dated Oct. 30, 2018, 13 pgs.

(Continued)

*Primary Examiner* — Kelly L Jerabek
(74) *Attorney, Agent, or Firm* — Seed Intellectual Property Law Group LLP

(57) ABSTRACT

Processing raw image data in a camera includes computing a luminance image from the raw image data, and computing a chrominance image corresponding to at least one of the sensor's image colors from the raw image data. The luminance image and chrominance image(s) can represent the same range of colors able to be represented in the raw image data. The chrominance image can have a lower resolution than that of the luminance image. A camera for performing the method is also disclosed.

20 Claims, 6 Drawing Sheets

(56) References Cited

U.S. PATENT DOCUMENTS

| | | | |
|---|---|---|---|
| 2008/0056607 A1* | 3/2008 | Ovsiannikov | H04N 5/217 |
| | | | 382/275 |
| 2009/0129695 A1* | 5/2009 | Aldrich | H04N 5/217 |
| | | | 382/261 |
| 2009/0316984 A1 | 12/2009 | Lee | |
| 2011/0134292 A1 | 6/2011 | Hirai | |
| 2012/0127347 A1* | 5/2012 | Kim | G06T 3/4015 |
| | | | 348/231.99 |
| 2016/0277721 A1* | 9/2016 | Roffet | H04N 9/045 |
| 2016/0284054 A1* | 9/2016 | Koskinen | H04N 5/217 |
| 2018/0139407 A1* | 5/2018 | Togita | H04N 19/124 |

OTHER PUBLICATIONS

Doutre, C. et al., "A Fast Demosaicking Method Directly Producing YCbCr 4:2:0 Output", IEEE Transactions on Consumer Electronics, IEEE Service Center, New York, NY, US, vol. 53, No. 2, May 1, 2007 (May 1, 2007 ), pp. 499-505.

Benahmed Daho, O. et al., "A JPEG-like algorithm for compression of single-sensor camera image", Proceedings of SPIE, vol. 7876, Jan. 23, 2011 (Jan. 23, 2011), p. 787610, XP055516312, 1000 20th St. Bellingham WA 98225-6705 USA ISSN: 0277-786X, DOI: 10.1117/12.872416 ISBN: 978-1-5106-2011-7.

Examination Report for EP Application No. 18 178 109.7 dated Aug. 7, 2020, 6 pgs.

Jain, A.K., "Magnification and Interpolation (Zooming)" In: Fundamentals of Digital Image Processing, Jan. 1, 1989, Sec. 7.4 Spatial Operations, pp. 253-255.

\* cited by examiner

RAW IMAGE PROCESSING SYSTEM AND METHOD

BACKGROUND

Technical Field

The disclosure relates to methods of image processing in a camera. The illustrative embodiments will focus on an image captured using an RGB Bayer color filter array, but other embodiments could be implemented with different image capture arrangements, including CFAs including white or unfiltered pixels.

Description of the Related Art

Digital color cameras capture color images of real-life scenes electronically using an image sensor, usually a charge-coupled device (CCD) or a complementary metal oxide semiconductor sensor (CMOS). Due to the monochromatic nature of the image sensor, digital camera manufacturers implement various solutions to capture the color nature of the scene. These solutions include using a three-sensor device which uses one sensor per color channel; using vertically color-sensitive photosites; or most commonly, using single-sensor device with a color filter array. A single-sensor device represents one of the most cost effective methods currently in use for color imaging and is widely utilized in digital cameras.

In a single-sensor camera, a color filter array (CFA), which is essentially a spatial array of color filters, is placed in front of a single image sensor to capture different spectral components (colors) at the same time. The filters of the CFA are spatially correlated with photosites of the single image sensor, so that each photosite has a corresponding spectrally selective filter. A raw image captured by a single-sensor camera generally constitutes a mosaic-like grey-scale image with only one color element at each photosite. The raw image is then subject to a series of image processing steps to generate an image that realistically represents the true visual scene captured.

The most common type of CFA used is a Bayer CFA with alternating red, green and blue color filters as shown in FIG. 2. As there is only one color type captured at each photosite, the raw image captured is a "mosaic" of red, green, and blue values, each at a different photosite.

A process known as "demosaicing" is used to generate full color information for each photosite. In this process, the missing color information of a photosite is determined from neighboring photosites by an interpolation process. When tri-chromatic image acquisition is used on a sensor with a Bayer CFA, the amount of raw image data is increased by a factor of three by this demosaicing process. Further processing such as white balancing, color transformation, noise reduction, tone mapping may also be required. These processing steps can be performed as follows:

(1) Carried out before the camera stores the image, so that the stored image is ready to be viewed at any time on a display by a user. Most consumer camera applications choose to process raw image data before it is stored as immediate viewing of captured images or videos is often highly desired.

(2) The camera may delay some such image processing steps mentioned above until post-processing. This approach is more common for professional camera applications. Both options have their own advantages and disadvantages.

As discussed above, the first option involves applying a variety of image processing algorithms to an image sensor's raw data, such as demosaicing then compressing the demosaiced image data. The major disadvantages of this option are limitations in post processing as well compression inefficiency. The limitations in post processing are due to certain color processing having been already applied to the demosaiced data and potentially certain image information being lost in the compression process. The compression inefficiency is due to the demosaicing algorithm leading to triple the amount of data compared to the raw image data. This additional data then needs to be compressed more heavily to achieve a smaller size or bitrate before the image is stored.

The second option involves encoding and compressing image sensor's raw image data, and then storing the compressed mosaic raw image data without demosaicing, white balancing etc. This option provides more flexibility in post processing as all of the visual information captured by the image sensor is retained. It also requires less compression compared to encoding the image after fully demosaicing the raw data because no additional image data is created by demosaicing. However, it requires extensive processing at the decoding stage such as full demosaicing as well as any further image processing that may be required.

BRIEF SUMMARY

The present disclosure provides a camera raw image data processing method and/or a system that aims to address at least some of the issues mentioned above, or at least provides a useful alternative.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

In broad concept, the present disclosure provides a method of processing raw image data in a camera. The method broadly includes computing a luminance image from the raw image data; and computing at least one chrominance image corresponding to at least one of the sensor's image colors from the raw image data. The luminance image and chrominance image(s) can represent the same range of colors able to be represented in the raw image data. In the present specification if an image or image data is described as representing raw image data output from the image sensor, it should be understood to mean that the image or image data has not undergone processing that reduces the range of color values that are able to be represented by the image or image data. That is, the data range of the image or image data has not been limited or clipped compared to what was able to be output by the image sensor. Of course, it should be understood that an image or image data of any given image type (e.g., luminance image, chrominance image, color plane) may not itself be able to represent the whole color range able to be contained in the raw image data.

Embodiments of the present disclosure further provide a method that broadly includes demosaicing sensor raw image data to generate respective demosaiced images at each capture color, computing a luminance image from the demosaiced image data, and computing a chrominance image corresponding to at least one of the sensor's image colors, where the chrominance image has a resolution less than that of the luminance image. Advantageously the demosaicing can be performed in a manner which is optimized for the camera's image sensor.

In the following description, a "color filter array" should be understood to include, in addition to conventional color filter arrays, filter arrays that include positions in the filter array with:

no color filtering, e.g., no filter at all being present, a neutral density filter, a clear, light transmissive filter element; and filtering with passbands not associated with a given color (e.g., highpass filters, lowpass filters, wide passband filters, etc.).

Accordingly the concept of a "color" in a color filter array or color of an image (and related uses of the word color) serves as a designator of the passband of the corresponding a filter element in the color filter array.

In a first aspect, the present disclosure provides a method of processing image data in a camera, said camera including an image sensor with a color filter array, wherein the image sensor includes an array of photosites, each photosite being configured to receive light at a respective one of a plurality of colors in the color filter array and output a pixel value indicating an intensity of light captured at the corresponding photosite. The method can include generating a luminance image having a first resolution representing raw image data output from the image sensor, and generating at least one chrominance image representing raw image data output from the image sensor said chrominance image having a second resolution that is less than the first resolution.

In a another aspect, the disclosure provides a method of processing image data in a camera, said camera being configured to capture raw image data using an image sensor with a color filter array, wherein the image sensor includes an array of photosites, each photosite being configured to receive light at a respective one of a plurality of colors in the color filter array and output a pixel value indicating an intensity of light captured at the corresponding photosite. The method includes:

demosaicing the captured raw image data to generate a plurality of color images corresponding to the plurality of colors of the color filter array;

generating a luminance image having a first resolution; and generating at least one chrominance image corresponding to a respective one of the color filter array colors having a second resolution that is less than the first resolution.

Demosaicing can include generating a color image corresponding to each color of the color filter array. Preferably the color images at each color are at the first resolution.

Embodiments of the above aspects of the disclosure can include a variety of optional features.

In preferred cases, two or more chrominance images are generated.

In any of the above aspects, generating a color image (of a given color) can include:

for each pixel in the color image, performing at least one of edge and line detection on the basis of a plurality of pixels surrounding the pixel, and on the basis of said edge or line detection determining the pixel value.

Determining the pixel value can include selecting a subset of the pixels surrounding the other pixel from which to determine the pixel value. It can alternatively or additionally include applying a weighting to the pixels in the subset when determining said pixel value. The weighting of the pixel in said subset can be determined on the basis of a noise level applicable to either the pixel of the subset being weighted or the subset of pixels.

The demosaicing process preferably estimates missing color information for each photosite or each pixel where it is missing, based on neighboring pixel values. The method employed in the preferred embodiments preferably preserves as much fine image detail as was captured by the pixels of the respective color type, and which is distinguishable from random noise. Moreover the random noise level is reduced in each image plane while preserving the edges of fine details.

Preferably the captured raw image data has a resolution of N×M pixels. The luminance image may also have a resolution of N×M pixels.

The luminance image can be generated by combining a plurality of pixel values corresponding to the same pixel location from the plurality of demosaiced color images. In one form, the step of combining pixel values includes weighting the plurality of pixel values for each pixel location. In one form, where a conventional Bayer RGB color filter array having the same ratio of Red, Blue and Green pixels as a conventional Bayer RGB CFA is employed, the luminance value Y at position (i,j) is computed by the following formula:

$$Y(i,j)=(R(i,j)+2G(i,j)+B(i,j))/4\{i=1,\ldots,N;j=1,\ldots,M\},$$

wherein Y(i,j) denotes luminance value of a given pixel location (i,j), and R, G, B denote the pixel value in the red, green, and blue color images at the pixel location. Preferably the first resolution of the luminance image is the full resolution of N×M pixels.

The step of generating the chrominance image includes, calculating difference values between the raw image pixel values and the luminance image values at a subset of pixels in the luminance image. Preferably the chrominance image is calculated at pixels corresponding to pixels of a given color in the CFA. For example, for a camera that uses a single sensor and a standard RGB Bayer filter CFA, a blue and a red chrominance image can be generated. The blue chrominance image includes only pixel values corresponding to the blue pixels of the CFA, this applies mutatis mutandis to the Red chrominance image. Thus the chrominance image is at a second, lower resolution than the luminance image. In the RGB Bayer filter example, the chrominance images have a quarter of the number of pixels as the luminance image. In this case, the step of calculating the difference values for each pixel (at location i,j) of a chrominance image may use the following formulas:

$$CB(i,j)=(B(i,j)-Y(i,j))/kB\{i=1,\ldots,N/2;j=1,\ldots,M/2\},$$

$$CR(i,j)=(R(i,j)-Y(i,j))/kR\{i=1,\ldots,N/2;j=1,\ldots,M/2\},$$

where kB and kR are scaling factors;

CB(i,j) and CR(i,j) denote the blue-difference and red-difference values of a given pixel location (i,j);

R(i,j), B(i,j) denote the pixel value in the red, green, and blue color images at the pixel location (i,j); and Y(i,j) denotes the luminance value at pixel location (i,j).

Preferably, kR and kB are chosen to maximize the precision in the data range for CB(i,j) and CR(i,j) but without clamping the value so that the full range of the color response is preserved. In one example, kR=kB=2.

The method may further include:
- encoding and/or compressing the luminance values calculated, and the difference values.

The luminance image and the chrominance images can be compressed as separate images, or compressed as a related group of images together. Preferably compression uses transform coding, for example using wavelet transform or discrete cosine transform or the like.

More preferably the compression is performed using JPEG, or JPEG 2000 compression. Use of such compression algorithms may be convenient because the calculated luminance image and the chrominance images can be used directly in the compression process. In one case, the method can include:
- encoding the luminance values and the difference values to generate image data compatible with a YCbCr 420 format.

In a further aspect, the present disclosure provides a method of processing image data in a camera. The camera can include an image sensor with a color filter array, wherein the image sensor includes an array of photosites, each photosite being configured to receive light at a respective one of a plurality of colors in the color filter array and output a pixel value indicating an intensity of light captured at the corresponding photosite. The method can include demosaicing the captured raw image data to generate a plurality of color images representing the raw image data output from the image sensor and corresponding to the plurality of colors of the color filter array, wherein the demosaicing includes:
- generating a color image corresponding to each color of the color filter array, wherein for each pixel in a color image, performing at least one of edge and line detection on the basis of a plurality of pixels surrounding in said pixel in the mosaiced, captured raw image data, and on the basis of said edge or line detection determining a pixel value by selecting a subset of the pixels surrounding the given pixel, said subset of pixels being of the same color as said pixel, and calculating a weighted average of the pixels in the subset.

Weighting of the pixels in said subset is preferably determined on the basis of a noise level applicable to either the pixel within the subset being weighted or the subset of pixels.

Preferably each color image represents the raw image data output from the image sensor. The method can further include, generating a luminance image representing raw image data output from the image sensor, and generating at least one chrominance image representing raw image data output from the image sensor. Preferably at least two chrominance images are generated. In a further aspect, the present disclosure includes a camera configured to implement an embodiment of any of the methods described above. The camera can include:
- an image capture system configured to convert received light into raw image data; and
- an image processing system configured to process the raw image data in accordance with the aforementioned method.

As used herein, except where the context requires otherwise, the term "comprise" and variations of the term, such as "comprising", "comprises" and "comprised", are not intended to exclude further additives, components, integers or steps.

Further aspects of the present disclosure and further embodiments of the aspects described in the preceding paragraphs will become apparent from the following description, given by way of example and with reference to the accompanying drawings.

BRIEF DESCRIPTION OF THE SEVERAL VIEWS OF THE DRAWINGS

FIG. 4 illustrates a series of fully demosaiced image planes corresponding to the image captured by a sensor arrangement of FIG. 2.

FIG. 5 illustrates a set of first order central differences used in detecting edges in a pixel value determination process.

FIG. 6 illustrates a set of second order central differences used in detecting fine lines when performing pixel interpolation.

DETAILED DESCRIPTION

Embodiments will be described with reference to specific examples, but the scope of the invention should not be considered as being limited to such examples. For example, the illustrative embodiment will be described in the context of a camera using a single sensor with a conventional RGB Bayer color filter array. However, embodiments of the present disclosure could be applied for use with other color filter arrays, including color filter arrays that include "white", neutral density, or unfiltered pixels within the array.

Figure 1:
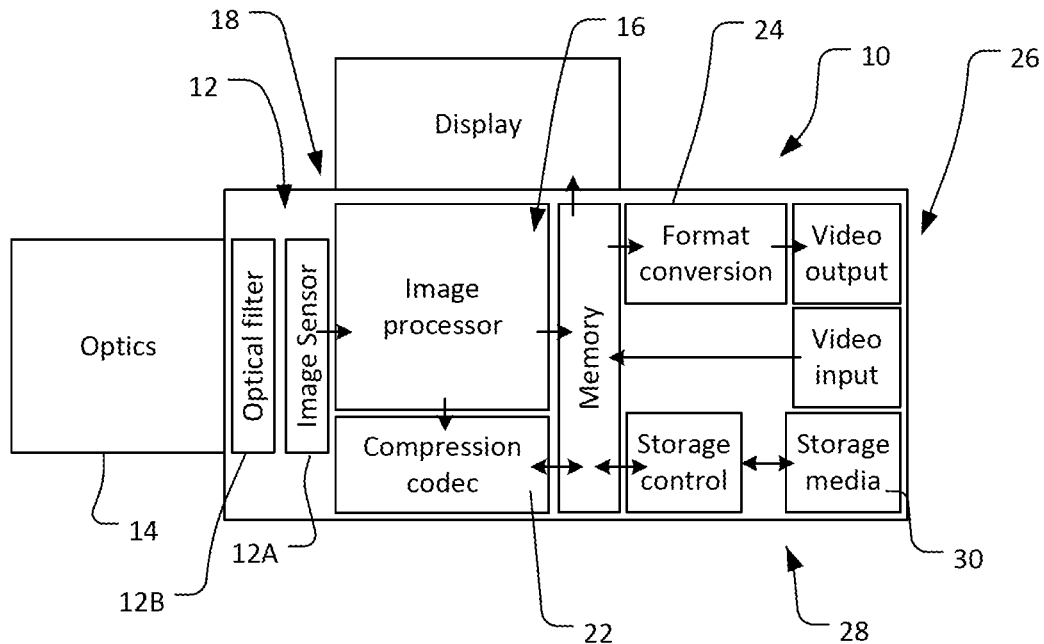
FIG. 1 is a schematic block diagram of a camera able to implement a method as described herein.
Figure 2:
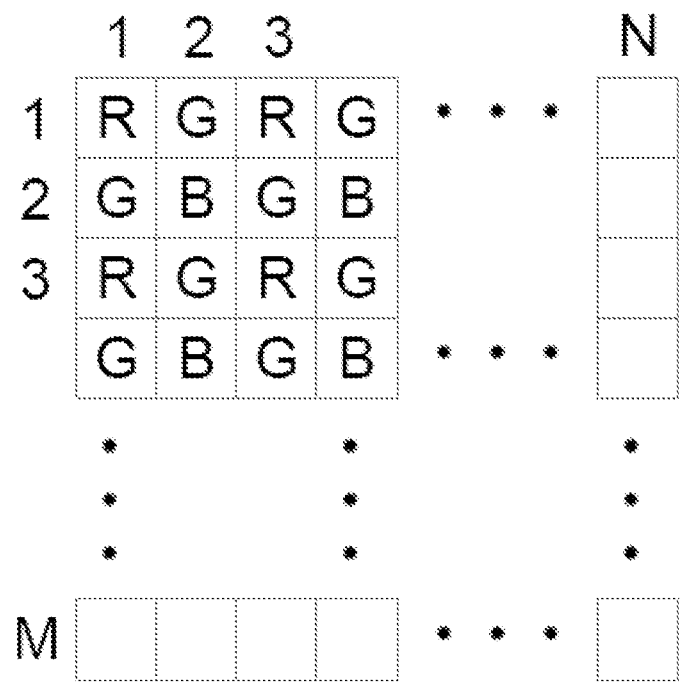
FIG. 2 illustrates the arrangement of an exemplary CFA applied to a sensor having a resolution of N×M pixels, and its corresponding image format.

FIG. 1 is a schematic representation of a camera 10 capable of implementing a method according to the present disclosure. The camera 10 includes an image capture system 12 configured to convert received light into raw image data. In this example the image capture system 12 includes an image sensor 12A (e.g., a CCD or CMOS image sensing chip or similar) and associated optical filter 12B (e.g., an IR cut-off filter or an optical low pass filter). An optical system 14, e.g., lens is also provided to form images on the image sensor. The image sensor includes a color filter array (CFA), in the form of a spatial array of color filters, placed in front of the image sensor chip to enable capture of color images. The filters of the CFA are spatially correlated with photosites of the single image sensor, so that each photosite has a corresponding spectrally selective filter. As noted above, in this example the CFA used is a Bayer CFA with alternating red, green and blue color filters as shown in FIG. 2. As there is only one color type captured at each photosite, the raw image captured is a "mosaic" of red, green, and blue values, each at a different photosite.

FIG. 2 illustrates the format of a raw image output by the sensor which corresponds to its arrangement of filter elements. The raw image data has a resolution of N×M pixels corresponding to an N×M array of photosites of the image sensor. Since each photosite has a corresponding filter element it receives light at a respective one of a plurality of colors in the CFA and output a pixel value indicating an intensity of light captured. The color of light captured at each photosite is indicated by the indication R, G, B on each pixel in FIG. 2. In the conventional manner, "R" indicates a red pixel, "G" a green pixel, and "B" a blue pixel.

The sensor raw video data that is generated by the image capture system 12 is passed to the image processing system 18. The image processing system 18 may comprise one or more data processors, such as an ASIC or FPGA or microprocessor with associated software, and is configured to perform a range of image processing tasks. The image processor 16 can perform tasks that include but are not limited to: correction of unwanted optical effects such as pincushion distortion or others, demosaicing the Bayer mosaic image, noise reduction, correction of pixel-to-pixel variations in captured video data, e.g., by removing dead pixels and correcting for conversion efficiency variations. Working memory 20 is provided to enable temporary storage of data or software or the like during image processing and or image compression and other tasks.

The image processing system 18 may also include a video encoding system 22. The video encoding system 22 will typically be implemented by providing software configured to enable a processor to implement one or more video codecs. This system can be used to encode and optionally compress the video data into a desired format. For example, the video encoding subsystem 22 can be configured to encode video data into any known video data format.

The image processing system 18 may also include a format conversion system 24 which processes video output data into a format that is able to be transmitted over a video transmission system 26. The video transmission system 26 is generally configured to only transmit video data which complies with one or possibly several video transmission protocols. The format conversion system 24 is provided to format the video data into one of said video transmission formats to enable transmission, before being passed to the video transmission system 26. This can include transcoding video data from its original format into (one of) an appropriate video transmission format of the video transmission system 26.

The video transmission system is operable to transmit (and optionally receive) video output data via a video interface having at least a video output port. The video interface can be bi-directional and thus also include a video input port. As an example, the video interface could be an SDI interface or other like interface.

The camera also includes a data storage system in the form of a memory control subsystem 28 which is configured to control persistent storage of video data (and any other data) on a local non-volatile memory 30. The local memory 30 may use a removable memory such as a memory card or removable hard drive. However in the general case the memory control subsystem 28 is arranged to transmit and/or receive control signals to/from the local memory 30 to control storage and retrieval of video data on the memory 30 and also to perform any encoding or formatting of data for storage. The memory 30 could be a solid state drive operating according to the Serial ATA protocol, in which case the memory control subsystem will operate to control operation of the SATA drive and manage reading and writing of data to it.

Figure 3:
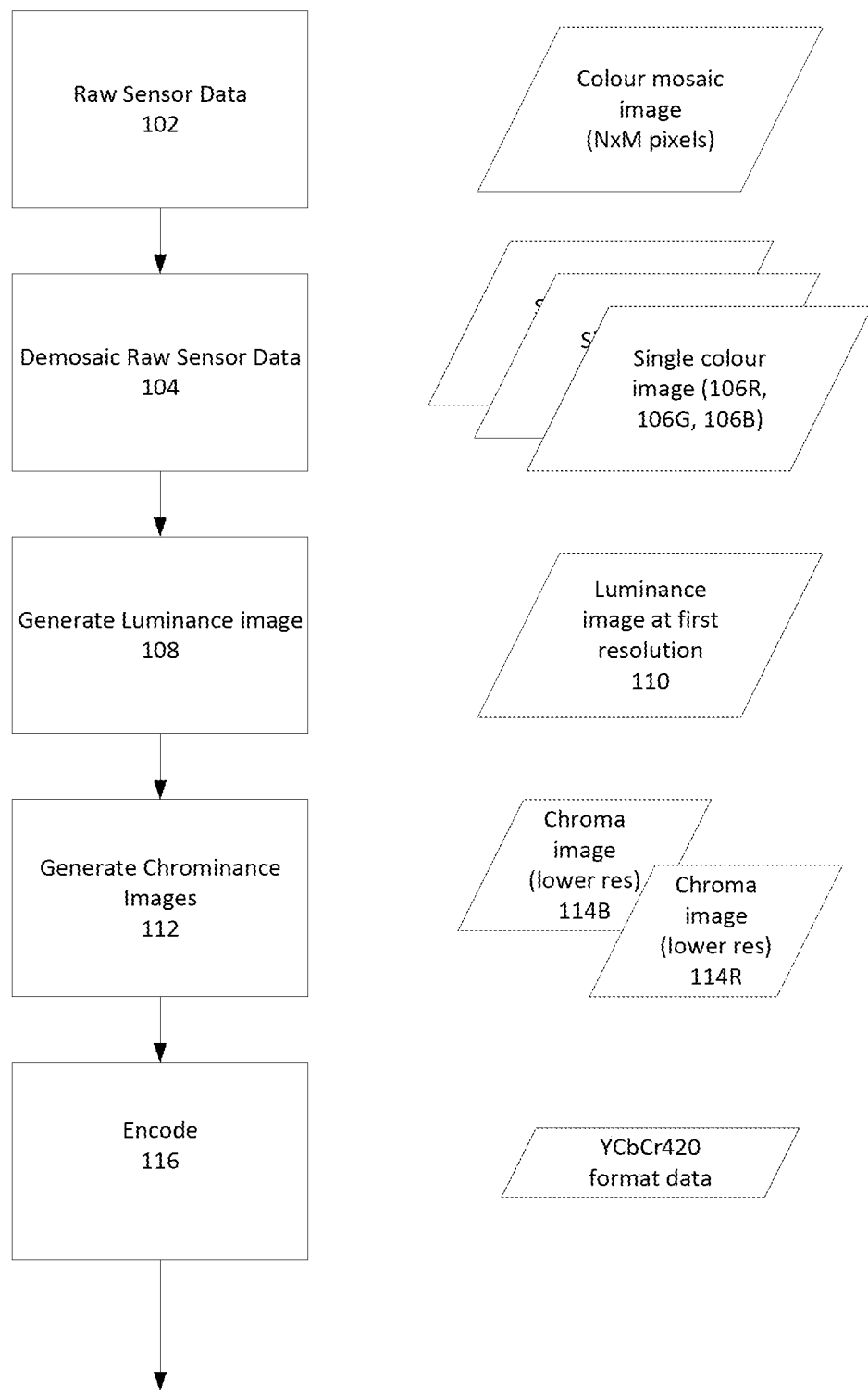
FIG. 3 is a flowchart illustrating an overview of an exemplary method.

FIG. 3 illustrates broadly the method used in an illustrative embodiment to process the raw video data.

The method 100 begins with raw sensor image data 102 in the form a mosaiced multiple color image having a resolution of N×M pixels. In the preferred embodiment, the raw sensor data is preferably largely unprocessed sensor data. By this it is intended to mean that the raw data preserves the range of colors captured by the sensor, such that the color range is not limited or clipped. Any white or color balance can be applied after decoding processed data—e.g., in post-production. The raw sensor image data 102 is demosaiced 104 to generate respective demosaiced images 106R, 106G, 106B (color planes). Each image 106R, 106G, 106B corresponds to one of the CFA colors. Following this, a luminance image 110 computed 108 from the demosaiced images 106R . . . 106B. Then one or more chrominance images, 114B, 114R corresponding to at least one of the sensor's image colors is generated 112. Demosaicing 104 generates color images having a first resolution. Generally speaking, this will be the full resolution of the captured image data (N×M pixels). The luminance image 110 will typically also be at the same resolution as the demosaiced images 106R, 106G, 106B, however the chrominance images 114B, 114R will usually be at a lower resolution. Finally an encoding step 116 is performed in which the Luminance images and chrominance images are encoded, e.g., by compressing and or formatting for further use (e.g., storage, transmission, display etc.). Advantageously data output from the encoding step can comply with a known standard format to enable handling and processing with known tools. Example implementations of each of these steps will be described below. In a preferred embodiment, throughout this process it is preferable that the image data preserves the range of colors captured by the sensor, such that the color range is not limited or clipped, thus enabling the data to be effectively treated in downstream processing as if it were raw image data.

Demosaicing 104

Figures 4, 5, 6:
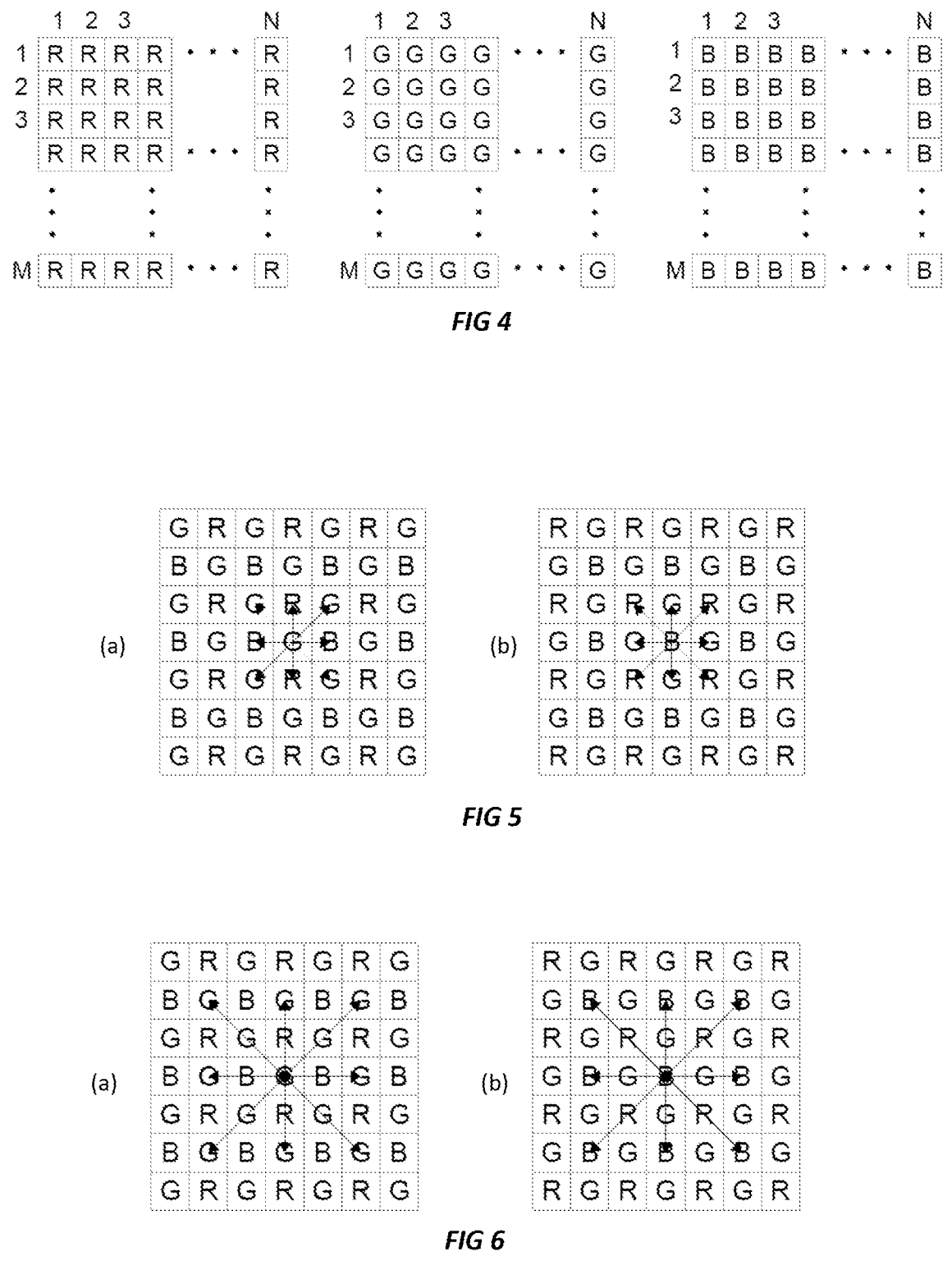

Demosaicing generates, from the single, multiple-color, mosaic, raw image data 102 respective images 106R, 106G, 106B for each of the CFA colors. As will be appreciated, each final single color images 106R, 106G, 106B contain more pixels of each color than were originally captured, and hence interpolation is needed to estimate pixel values missing in each color image. FIG. 4 shows the format of the demosaiced single color images 106R, 106G, 106B, each of which have a resolution of N×M pixels.

The demosaicing process selected in the illustrative embodiment is optimized to retain the fine details captured by the image sensor and also reduce noise that might have been introduced by the image sensor.

The demosaicing process is based on a weighted interpolation method. However, rather than solely calculating the value of "missing" pixels in each single color image, the same pixel value determination process is preferably performed at all photosites (i,j) to obtain the three color images 106R, 106G and 106B. As such, a pixel value calculation may advantageously be performed for all colors (of the CFA) at all locations, even if a captured color value that is available at a specific photosite. This can ensure balance across all photosites with respect to noise distribution, and in a three color Bayer CFA, can compensate for any deviations between the two green photosites in a 2×2 Bayer macro pixel.

In overview, the pixel calculation used in demosaicing involves:

(a) detecting edges and/or fine lines based on pixels surrounding the pixel value to be determined, and/or (b) using the edge/fine line information to select or weight contributions from neighboring pixels for interpolation.

This process is edge sensitive at various angles to retain edges and shapes in the intermediate (demosaiced) image data. Step (a) can be performed by calculating gradients (first differences) at different angles within the different color filter patterns. FIG. 5 shows examples of the first order central differences at a location (i,j) being on a green photosite (FIG. 5(a)) or on a blue photosite (FIG. 5(b)). In either case, the central differences can be computed in 4 directions, as differences between 2 photosites of the same type opposite of each other with respect to the location of (i,j). The differences can be computed as follows:

$$D1h(i,j)=\text{abs}(P(i-1,j)-P(i+1,j))$$

$$D1v(i,j)=\text{abs}(P(i,j-1)-P(i,j+1))$$

$$D1u(i,j)=\text{abs}(P(i-1,j+1)-P(i+1,j-1))$$

$$D1d(i,j)=\text{abs}(P(i-1,j-1)-P(i+1,j+1))$$

These are absolute central differences in horizontal and vertical, as well as diagonal up and down directions. They are computed at any photosite (i,j) from the original photosites P(i,j) independent of the color type of the photosite.

While these gradients are computed in a 3×3 window to determine edge directions at any location (i,j), the second order differences are computed in a 5×5 window as a means for line detection in different directions. FIGS. 6(a) and (b) show the second order differences in the same four directions on a green and blue photosite respectively. These differences can be computed as absolute differences as follows:

$$D2h(i,j)=\text{abs}(2*P(i,j)-P(i-2,j)-P(i+2j))$$

$$D2v(i,j)=\text{abs}(2*P(i,j)-P(i,j-2)-P(i,j+2))$$

$$D2u(i,j)=\text{abs}(2*p(i,j)-P(i-2,j+2)-P(i+2,j-2))$$

$$D2d(i,j)=\text{abs}(2*P(i,j)-P(i-2,j-2)-P(i+2,j+2))$$

The first order central differences can be used to detect edges at four different angles at any center pixel location or color type. The second order central differences can be used to detect fine lines at the same four different angles at any center pixel location or color type. The combination of first and second order differences provides information about both types of image detail, edges as well as lines, at the four different angles. The combination of both detector types can be achieved by adding the two absolute differences for the different angles as follows:

$$D12h(i,j)=D1h(i,j)+D2h(i,j)$$

$$D12v(i,j)=D1v(i,j)+D2v(i,j)$$

$$D12u(i,j)=D1u(i,j)+D2u(i,j)$$

$$D12d(i,j)=D1d(i,j)+D2d(i,j)$$

This is the primary set of angular detectors in horizontal and vertical as well as up and down diagonal directions. A secondary set of angular detectors can be determined using the combination of a vertical (or horizontal) direction with each of its neighboring diagonal directions which provides another set of four angles. The angular detectors deliver information about the angular direction of the smallest differences, which are used to determine the direction of averaging.

Figure 7:
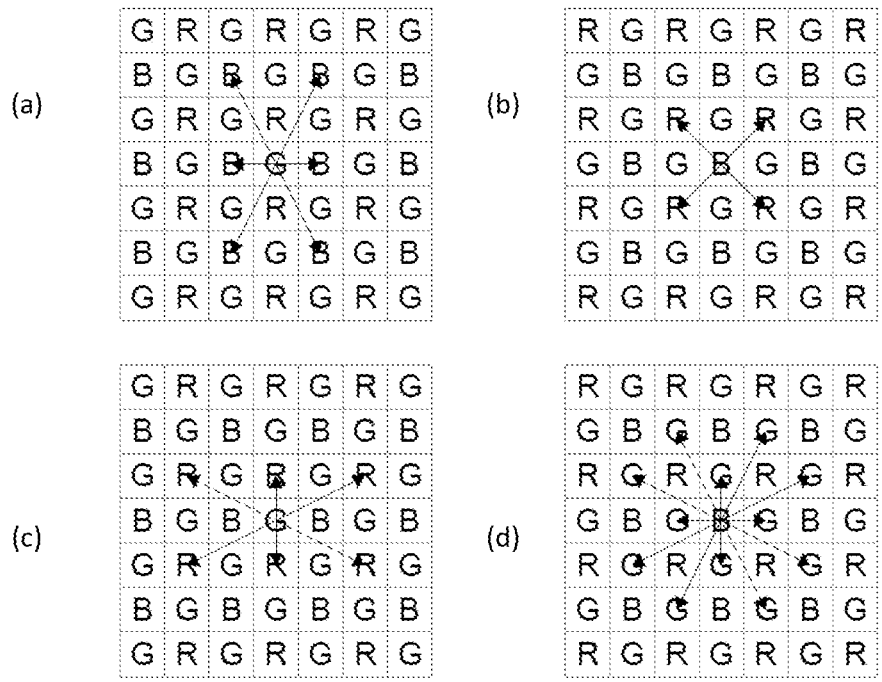
FIG. 7 illustrates a series of pixel pairs useable in performing pixel averaging when demosaicing an image captured by the sensor arrangement of FIG. 2.

In step (b), the process uses these sets of angular detectors to determine how to combine neighboring pixel values to compute each color value 106R, 106G, 106B. This can include either selecting or weighting of certain pixel averages. FIG. 7 shows the different possible averaging directions between two pixels of the color type to be estimated. Each pair has the following characteristics:

pixels are equal distance from the center pixel;
are directly opposite the center pixel;
lies at a different angle with in a 5×5 window about the center pixel; and
has a corresponding edge/line detector or one can be determined by a combination of two edge/line detectors.

In FIG. 7(a), a blue color value needs to be determined on a green photosite. Three different pixel averages can be included into the pixel value determination within a 5×5 window centered at the green photosite. These three averages are computed as:

$$M1h(i,j)=(P(i-1,j)+P(i+1,j))/2$$

$$M2a(i,j)=(P(i-1,j-2)+P(i+1,j+2))/2$$

$$M2b(i,j)=(P(i-1,j+2)+P(i+1,j-2))/2$$

Another example in FIG. 7(b) can be used for computing a red color value on a blue photosite. Two different photosite averages can be included in this case which are computed as:

$$M1u(i,j)=(P(i-1,j+1)+P(i+1,j-1))/2$$

$$M1d(i,j)=(P(i-1,j-1)+P(i+1,j+1))/2$$

The corresponding angular edge detectors are used to determine the weighting for each of the averages to estimate each color value while preserving any edges or fine lines. The corresponding weighting factors w( ) for each direction of pixel averages used for a certain color are derived from the first and second order differences in the particular direction. Generally, a higher weighting is desired for directions having lower differences in that particular direction. The weighting function provides weighting factors in the range 0 to 1 depending on the absolute differences. An optimal weighting function could assign maximum weighting when the difference is lower than the noise threshold at a particular response level of a photosite. Once the difference rises above the noise threshold, the weighting should gradually decrease and eventually become 0 for large differences in a particular direction. An exponential function can be used to create the weighting factors but the method is not limited to a specific function. The weighting function can also take the distance of the two averaged pixels with respect to the center into account. A suitable weighting function usable in some embodiments is:

$$w(D) = e^{\frac{-D^2}{\sigma^2}}$$

where D represents the difference value being weighted, and σ is the standard deviation of the noise distribution of the sensor at signal level of the pixel.

FIG. 7(b) requires computing a red color value at a blue photosite. The closest red photosites are diagonally opposite the center location in both up and down directions. In this case, the pixel value determination within a 5×5 window would be $$R(i,j)=(w(D12u(i,j))*M1u(i,j)+w(D12d(i,j))*M1d(i,j))/(w(D12u(i,j))+w(D12d(i,j)))$$

This example only uses the first order gradient edge detector. The weighting function w( ) can also be applied to the sum of absolute first and second order differences to include both edge as well as line detection in the weighted interpolation. The minimum weighting factor in w( ) should also always be larger than 0 to avoid a division by 0. The scheme for determining a blue pixel value for a red photosite is the same, but displaced so as to be centered on a red photosite.

FIG. 7(a) requires computing a blue color value at a green photosite, and shows three different directions, of which two do not exactly match with the four directions of first and second order differences. While the horizontal component has a corresponding edge and line detector D12h, the pixel averages M2a and M2b do not.

The pixel value determination function then follows the same principle as above for FIG. 7(b).

FIG. 7(c) shows the possible pairs of pixels that can be averaged for computing, a red pixel value at a green photosite, within a 5×5 pixel region surrounding the central photosite. This is similar to the case of FIG. 7(a), but rotated 90 degrees. FIG. 7(d) shows the possible pairs of pixels that can be averaged for computing, a green pixel value at a blue photosite, within a 5×5 pixel region surrounding the central photosite. The scheme for determining a green pixel value for a red photosite is the same, but displaced so as to be centered on a red photosite.

Advantageously, using a pixel value determination process that averages multiple pixels leads to a reduction of random noise in the image. The absolute differences in each direction can be also compared to the expected deviations caused by random noise. As the image sensor is known for a given camera design and can be characterized with respect to its noise performance across the range of its output signal in any specific mode or configuration, a function can be determined that converts the output signal of the image sensor such that the standard deviation of the random noise is constant at any signal response level. This allows the algorithm to use a fixed weighting function for the absolute differences at any pixel location as well as at any signal level (digital value) of any color type pixel. This weighting function provides a smooth cut-off at the maximum deviation expected for the random noise component to distinguish between edges and fine lines to be preserved and random noise to be attenuated. Any angular direction that shows absolute differences below the noise level allows using the two pixel averages in that direction. As noise reduction improves by including more pixels into this directional noise weighted low pass filter the same principle is also applied to the pixel of the color type that was captured at a given location. The person skilled in the art will also notice that increasing the window size for the noise weighted low pass filter by extending the number of noise detectors as well as pixels to be averaged will improve the noise reduction capability of this approach.

Figure 8:
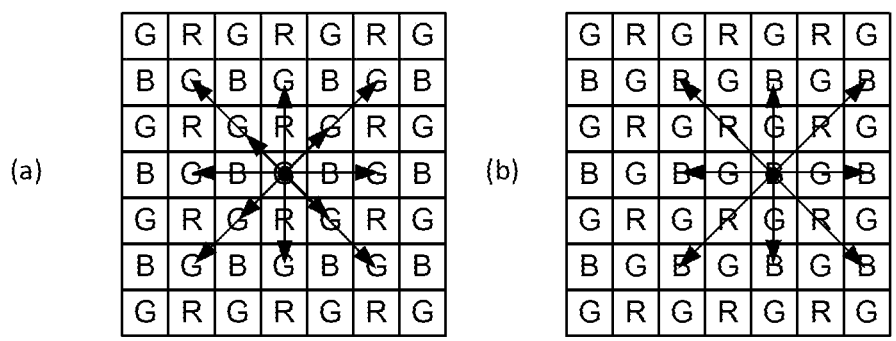
FIG. 8 illustrates a further series of pixel pairs useable in performing pixel averaging when demosaicing an image captured by the sensor arrangement of FIG. 2.

FIG. 8(a) illustrates the possible pairs of pixels that can be averaged for computing the green pixel value at the original green photosite, using the 5×5 pixel region surrounding it. FIGS. 8(b) and 8(c) show the pairs for blue and red photosites respectively. A pixel value calculation suitable for use in the case of FIG. 8(c) can be computed as follows:

$$R(i,j)=(P(i,j)+w(D12h(i,j))*M2h(i,j)+w(D12v(i,j)) \\ *M2v(i,j)+w(D12u(i,j))*M2u(i,j)+w(D12d(i,j)) \\ *M2d(i,j))/(1+w(D12h(i,j))+w(D12v(i,j))+w \\ (D12u(i,j))+w(D12d(i,j)))$$

In this case, the value of the original pixel will dominate the weighted sum if the differences in all directions are high or averaging with neighboring pixels in the direction of small differences that are below the noise level. The same pixel value calculation is done for blue pixel values when P(i,j) is a blue photosite. The value of a green photosite can be calculated as follows:

$$G(i,j)=(P(i,j)+w(D12h(i,j))*M2h(i,j)+w(D12v(i,j)) \\ *M2v(i,j)+w(D12u(i,j))*M2u(i,j)+w(D12d(i,j)) \\ *M2d(i,j)+w(D12u(i,j))*M1u(i,j)+w(D12d(i,j)) \\ *M1d(i,j))/(1+w(D12h(i,j))+w(D12v(i,j))+2*w \\ (D2u(i,j))+2*w(D12d(i,j)))$$

The method employed in the preferred embodiments preferably preserves as much fine image detail as was captured by the pixels of the respective color type, and which is distinguishable from random noise. Moreover, the random noise level is reduced in each image plane while preserving the edges of fine details.

Calculating a Luminance Image 110

The luminance image can be generated by combining a plurality of pixel values corresponding to the same pixel location from each of the plurality of demosaiced color images. In the preferred form, the step of combining pixel values includes weighting the plurality of pixel values for each pixel location. Where a conventional Bayer RGB color filter array is employed, the luminance value Y at position (i,j) can be computed by the following formula:

$$Y(i,j)=(R(i,j)+2G(i,j)+B(i,j))/4\{i=1,\ldots,N;j= 1,\ldots,M\},$$

wherein Y(i,j) denotes the luminance value of a given pixel location (i,j), and R, G, B denote the pixel value in the red, green, and blue color images at the pixel location. The luminance image will be at the full resolution of the demosaiced color images, namely N×M. It will be noted that the chosen weighting is computationally simple and approximates a luminance representation that can be efficiently encoded. However, different weighting factors could be used.

In preferred embodiments, the encoded data is seeking to represent raw image sensor data, rather than a color corrected representation that can be directly converted to a realistic color image. In other words, the luminance image has coefficients selected which enable the full range of the captured color to be preserved for post processing.

Calculating a Chrominance Image 112

The step 110 of generating the chrominance image includes, calculating difference values between pixels of one color plane and the corresponding luminance values at said pixel. This may preferably include calculating difference values between color pixel values and the luminance image values at pixels corresponding to pixels of a given color in the CFA. In this case, for pixels where a blue pixel is captured, a chrominance image pixel is generated to generate a blue channel chrominance image. As such, the blue chrominance image includes only pixel values corresponding to the blue pixels of the CFA, this applies mutatis mutandis to the Red chrominance image. Thus the chrominance image is at lower resolution than the luminance image. In the RGB Bayer filter example, the chrominance images have a quarter of the number of pixels as the luminance image. In this example, where a CFA is used with X=3 color types, X−1 chrominance images are created. This is generally sufficient. However, the concept can be extended to X>3 which allows for additional or more accurate representation of spectral components of the light that was captured. In such cases the system would still store X−1 chrominance images to keep the maximum amount of color information available. In cases where a white/clear filters in addition to the 3 color filters are included in the CFA, leading to X=4, it may be possible to generate X−2 Chrominance images, if one color primarily carries the luminance information in the scene. For example, this could be achieved by weighting the R, G, B components to create a first luminance image Y, that matches with a second luminance image Y2 that is directly captured with white/clear filters. These two luminance representations could then be combined into a single luminance image for encoding.

In the preferred form, the step of calculating the color difference values for each pixel (at location i,j) of a chrominance image may use the following formulas:

$$CB(i,j)=(B(i,j)-Y(i,j))/kB\{i=1, \ldots ,N/2;j=1, \ldots ,M/2\},$$

$$CR(i,j)=(R(i,j)-Y(i,j))/kR\{i=1, \ldots ,N/2;j=1, \ldots ,M/2\},$$

where kB and kR are scaling factors;

CB(i,j) and CR(i,j) denote the blue-difference and red-difference values of a given pixel location (i,j);

R(i,j), B(i,j) denote the pixel value in the red, green, and blue color images at the pixel location (i,j); and Y(i,j) denotes the luminance value at pixel location (i,j).

Preferably, kR and kB are chosen to maximize the precision in the data range for CB(i,j) and CR(i,j), e.g., to keep CB(i,j) and CR(i,j) in range. In one example, kR=kB=2.

Encoding 116

After generating the luminance image 110 and chrominance images 114R and 114B, these can be transmitted or stored. This may include compressing, formatting or otherwise encoding the data for use or storage. For example, the resulting luminance image 110 and chrominance images 114R and 114B can be compressed. Compression can be performed using any suitable of compression techniques (e.g., including techniques based on discrete cosine transforms (e.g., JPEG) and wavelet transforms (e.g., JPEG 2000). The compression method chosen can treat the luminance image 100, and chrominance images 114R, 114B entirely separately. However, they can be compressed in a common manner. In particular, they can be advantageously compressed using known techniques which conventionally include a colorspace transform as part of using such as JPEG compression, JPEG 2000.

Conveniently, the relative resolutions of the luminance image 110 and chrominance images 114R and 114B and spatial alignment of their pixels in the present embodiment means that they can be treated as a YCbCr 420 image data in further processing. This enables well known and implemented compression and transmission protocols to be used without modification.

The method may further include transforming the YCbCr 420 image to a different image format for further image processing. This can include de-coding the YCbCr image data and convert it back into RGB image format. For the illustrative embodiment, the RGB values of each pixel can be generated using the following calculations:

$$R(i,j)=kR \times CR(i,j)+Y(i,j) \text{ for } \{i=1, \ldots ,N;j=1, \ldots ,M\}$$

$$G(i,j)=Y(i,j)-kR/2 \times CR(i,j)-kB/2 \times CB(i,j) \text{ for } \{i=1, \ldots ,N;j=1, \ldots ,M\}$$

$$B(i,j)=kB \times CB(i,j)+Y(i,j) \text{ for } \{i=1, \ldots ,N;j=1, \ldots ,M\}$$

where (i,j) indicates the pixel location. This process allows reconstruction of the sensor raw image 102.

The method may further include displaying decoded video data or reconstruction of demosaiced color images.

However, as will be appreciated by the foregoing the chrominance image will have too few pixels to do so at full resolution. Thus if a full resolution data is required, it is necessary to generate additional pixel values for the chrominance image(s) by interpolation. This can be a simple bilinear interpolation as the chrominance components generally do not carry any high spatial frequencies.

The illustrative embodiment has several advantages in camera-based data processing, chief amongst these is that it encodes the raw image data in a way that substantially maintains the data range of the sensor raw data to provide the full flexibility of applying color transformation and tone mapping in post processing, whilst achieving relatively good compression ratios (compared to demosaiced unprocessed raw data). Moreover, the final data fits into existing RAW workflows, but reduces the level of processing required at the RAW decoding stage, which speeds up workflow and improves handling of the large amounts of image data.

Performing the main part of the demosaicing on the camera facilitates tailoring the demosaicing algorithm to the specific image capture sensor of the camera and its noise characteristics as well as to the compression codec and the desired compression ratio.

Figure 9:
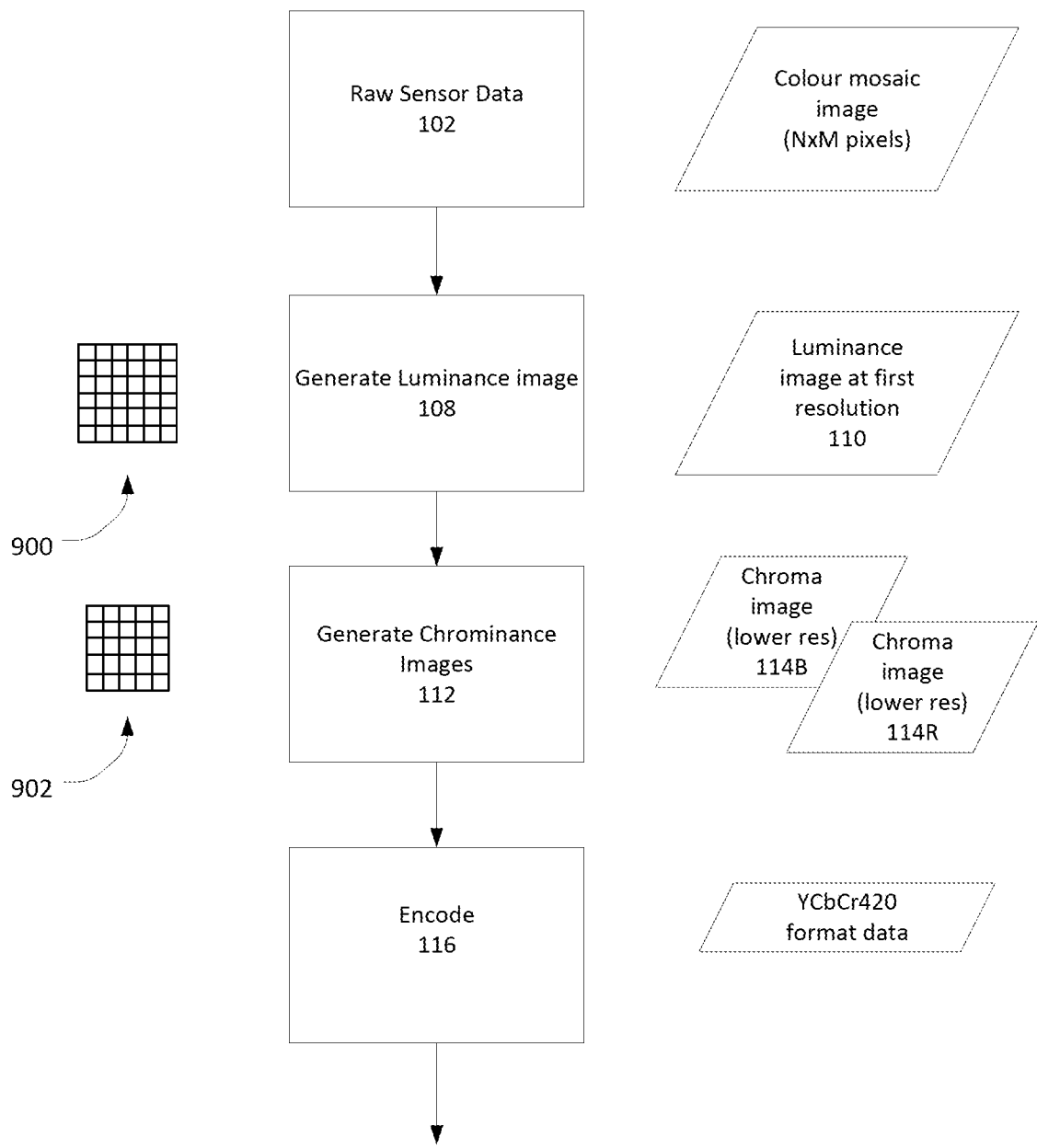
FIG. 9 is a flowchart illustrating an overview of an alternative method to that of FIG. 3.

FIG. 9 illustrates an alternative method to that of FIG. 3 to process the raw video data. The method 100 begins with raw sensor image data 102 in the form a mosaiced multiple color image having a resolution of N×M pixels. In the preferred embodiment the raw sensor data is preferably largely unprocessed sensor data. By this it is intended to mean that the raw data preserves the range of colors captured by the sensor, such that the color range is not limited or clipped. In the process of FIG. 9, the raw sensor image data 102 is not demosaiced prior to computation of the luminance and chrominance images. Instead, in step 108, the luminance image 110 is computed directly from the mosaiced image using a suitable filter kernel 900. Then, in step 112, one or more chrominance images, 114B, 114R is generated using suitable filter kernel 902.

Figures 10, 11:
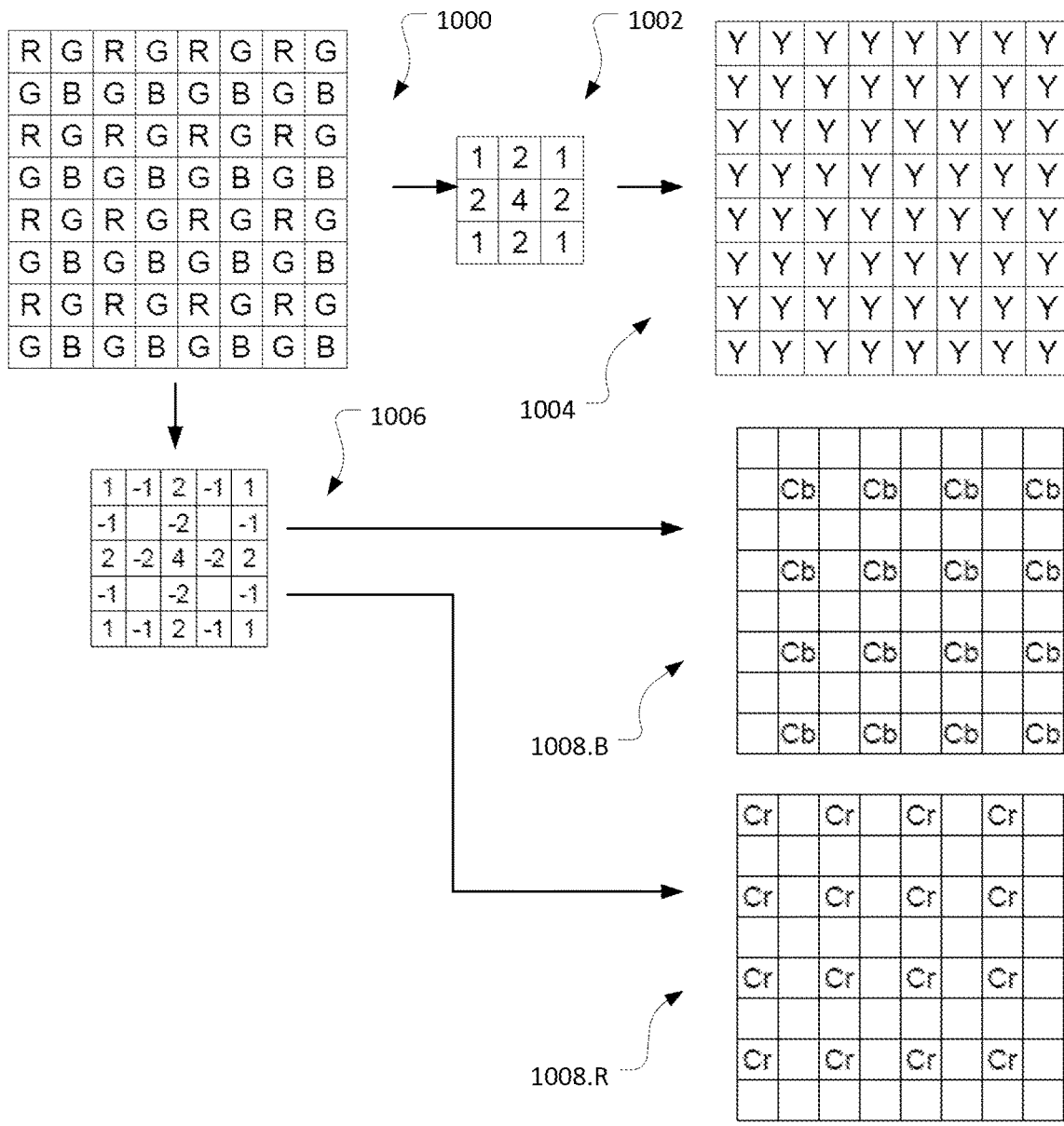
FIG. 10 illustrates the use of a 3×3 filter kernel to derive a luminance image, and a 5×5 filter kernel to compute chrominance images in the embodiment of FIG. 9.
FIG. 11 illustrates an alternative filter kernel usable to derive a full resolution luminance image in an embodiment of FIG. 9.

FIG. 10 illustrates the process for generating a luminance image 1004 and two chrominance images 1008.B and 1008.R from a mosaiced image 1000, captured with an image sensor with a conventional Bayer CFA. The values of the luminance image Y are equivalent to those of FIG. 3, and represent a combination of R, G, and B values in the following proportions:

$$Y=(R+2G+B)/4$$

Whereas in the example of FIG. 3, CB(i,j) and CR(i,j) were computed as (B−Y)/kB and (R−Y)/kR respectively, in the present example the chrominance images Cb and Cr, represent (B−G)/kB and (R−G)/kR respectively. That is the chrominance images are not differences with respect to the luminance image, but with respect to the green values.

In this example, each pixel value in the luminance image 1004 is generated using the 3×3 filter kernel 1002 illustrated in FIG. 10. The filter kernel 1002 represents the weightings applied to a weighted sum of pixel values covered by the filter and centered on the photosite of the pixel value to be calculated. The sum is divided by 16 to bring the value back into range. The example filter kernel approximates a 2-dimensional Gaussian type filter of specific width using simplified coefficients. However the same method can also be implemented using more complex filters to improve frequency response for a target purpose. An example of such is illustrated in FIG. 11.

Calculating the Cb and Cr values 1008B and 1008R respectively uses the 5×5 filter kernel 1006. To calculate the Cb values the filter kernel 1006 is applied to each blue photosite to calculate pixel values as described above. Each weighted sum is divided by 32 (being the sum of the filter weights) to bring each pixel value into range to get the final pixel value.

To calculate the Cr values, the filter kernel 1006 is applied to each red photosite in the mosaiced image 1000 to calculate pixel a corresponding Cr pixel value for that position as described above. Each weighted sum is divided by 32 (the sum of the filter weights) to bring each pixel value into range to get the final pixel value.

As in the previous example, the resolution of the Cb and Cr images are a quarter of that of the luminance image.

As will be appreciated, a modified approach will be needed to calculate pixel values for photosites closer than half a filter width from the edge of the mosaiced frame 1000.

FIG. 11 illustrates an alternative 2D Gaussian filter kernel 1102 that can be used in place of kernel 1002 in FIG. 10. As will be understood, the pixel values computed with such a filter kernel would be divided by 512 (being the sum of the filter coefficients). As will be seen, the alternative filter kernel 1102 covers a 9×9 region. Being wider, this filter kernel will achieve greater noise reduction than the 3×3 pixel kernel 1002. In some embodiments, it may be possible to select a preferred filter kernel (from two or more kernels, such as filter kernel 1002 and 1102) based on one or more properties of the image frames being processed (e.g., noise level in a given region of a frame).

Returning to FIG. 9, an encoding step 116 can be performed in which the Luminance images and chrominance images are encoded, e.g., by compressing and/or formatting for further use (e.g., storage, transmission, display etc.). As noted above, in a preferred form, the ratio of frame resolutions of the Y, Cr and Cb frames of the embodiments described herein lends itself to encoding as YCbCr 4:2:0 format. Moreover, the encoded image data most preferably preserves the range of colors captured by the sensor, such that the color range is not limited or clipped, thus enabling the data to be effectively treated in downstream processing as if it were raw image data.

It will be understood that the invention disclosed and defined in this specification extends to all alternative combinations of two or more of the individual features mentioned or evident from the text or drawings. All of these different combinations constitute various alternative aspects of the invention.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of processing image data in a camera, said camera including an image sensor with a color filter array, wherein the image sensor includes an array of photosites, each photosite being configured to receive light at a respective one of a plurality of colors in the color filter array and output a pixel value indicating an intensity of light captured at the corresponding photosite, wherein the method includes:
   demosaicing raw image data output from the image sensor to generate a plurality of color images representing the raw image data output from the image sensor and corresponding to the plurality of colors of the color filter array, the pixel values of each color image being generated irrespective of whether a pixel value of that color was captured at a photosite of the color filter array,
   wherein the demosaicing includes generating a color image corresponding to each color of the color filter array, and for each pixel in a color image:
      performing at least one of edge and line detection on the basis of a plurality of pixels surrounding said pixel in the mosaiced raw image data,
      on the basis of said edge or line detection, determining a pixel value by selecting a subset of the pixels surrounding the given pixel, said subset of pixels being of the same color as said pixel, and
      calculating a weighted average of the pixels in the subset.

2. The method of claim 1 wherein the weighting used in calculating a weighted average of the pixels in said subset is determined on the basis of a noise level applicable to either the pixel within the subset being weighted or the subset of the pixels.

3. The method of claim 1 wherein each color image represents the raw image data output from the image sensor.

4. The method of claim 1 wherein the method further includes:
   generating a luminance image representing the raw image data output from the image sensor; and
   generating one or more chrominance images representing the raw image data output from the image sensor.

5. The method of claim 4 wherein generating one or more chrominance images includes calculating one of:
   a difference between pixel values of a respective color image and the luminance image at a subset of pixels in the luminance image: and
   a difference between pixel values of a respective color image and a green image at a subset of pixels in the green image.

6. The method of claim 4 wherein any one or more of the luminance image and one or more of the chrominance images are generated from the raw image data using a filter kernel.

7. The method of claim 4 wherein the method further includes compressing at least one of the luminance image and any one or more of the chrominance images.

8. The method of claim 7 wherein the luminance image and two chrominance images are compressed together using a common compression algorithm.

9. The method of claim 4 wherein a color range of the raw image data is preserved in one or both of the luminance image and one or more of the chrominance images.

10. The method of claim 9 wherein the luminance image and two chrominance images are formatted in a YCbCr420 format.

11. A camera including an image sensor with a color filter array, wherein the image sensor includes an array of photosites, each photosite being configured to receive light at a respective one of a plurality of colors in the color filter array and output a pixel value indicating an intensity of light captured at the corresponding photosite, said camera further including an image processing system configured to:
    demosaic raw image data output from the image sensor to generate a plurality of color images representing the raw image data output from the image sensor and corresponding to the plurality of colors of the color filter array, the pixel values of each color image being generated irrespective of whether a pixel value of that color was captured at a photosite of the color filter array,
    wherein the image processing system is configured to demosaic the raw image data by generating a color image corresponding to each color of the color filter array, and for each pixel in a color image:
    performing at least one of edge and line detection on the basis of a plurality of pixels surrounding said pixel in the mosaiced raw image data,
    on the basis of said edge or line detection, determining a pixel value by selecting a subset of the pixels surrounding the given pixel, said subset of pixels being of the same color as said pixel, and
    calculating a weighted average of the pixels in the subset.

12. The camera of claim 11 wherein the weighting used in calculating a weighted average of the pixels in said subset is determined on the basis of a noise level applicable to either the pixel within the subset being weighted or the subset of the pixels.

13. The camera of claim 11 wherein each color image represents the raw image data output from the image sensor.

14. The camera of claim 11 wherein the image processing system is further configured to:
    generate a luminance image representing the raw image data output from the image sensor; and
    generate one or more chrominance images representing the raw image data output from the image sensor.

15. The camera of claim 14 wherein the image processing system is configured to generate at one or more chrominance images by calculating one of:
    a difference between pixel values of a respective color image and the luminance image at a subset of pixels in the luminance image: and
    a difference between pixel values of a respective color image and a green image at a subset of pixels in the green image.

16. The camera of claim 14 wherein any one or more of the luminance image and one or more of the chrominance images are generated from the raw image data using a filter kernel.

17. The camera of claim 14 wherein the image processing system is further configured to compress at least one of the luminance image and any one or more of the chrominance images.

18. The camera of claim 17 wherein the luminance image and two chrominance images are compressed together using a common compression algorithm.

19. The camera of claim 14 wherein a color range of the raw image data is preserved in one or both of the luminance image and one or more of the chrominance images.

20. The camera of claim 19 wherein the luminance image and two chrominance images are formatted in a YCbCr420 format.

* * * * *